United States Patent [19]
Morris et al.

[11] Patent Number: 6,079,012
[45] Date of Patent: Jun. 20, 2000

[54] COMPUTER THAT SELECTIVELY FORCES ORDERED EXECUTION OF STORE AND LOAD OPERATIONS BETWEEN A CPU AND A SHARED MEMORY

[75] Inventors: Dale C. Morris, Menlo Park, Calif.; Bernard L. Stumpf, Chelmsford; Barry J. Flahive, Westford, both of Mass.; Jeffrey D. Kurtze, Nashua, N.H.; Stephen G. Burger, Santa Clara, Calif.; Ruby B. L. Lee, Los Altos, Calif.; William R. Bryg, Saratoga, Calif.

[73] Assignee: Hewlett-Packard Company, Palo Alto, Calif.

[21] Appl. No.: 08/968,923

[22] Filed: Nov. 6, 1997

Related U.S. Application Data

[63] Continuation of application No. 08/234,207, Apr. 28, 1994, abandoned.

[51] Int. Cl.[7] .................................................. G06F 15/163
[52] U.S. Cl. ........................... 712/216; 709/106; 709/300
[58] Field of Search .................................... 712/209, 216, 712/217, 225; 709/300, 248, 213, 106

[56] References Cited

U.S. PATENT DOCUMENTS

| | | | |
|---|---|---|---|
| 4,439,828 | 3/1984 | Martin | 395/567 |
| 5,075,846 | 12/1991 | Reininger et al. | |
| 5,127,092 | 6/1992 | Gupta et al. | 395/580 |
| 5,265,233 | 11/1993 | Frailons et al. | 395/445 |
| 5,276,848 | 1/1994 | Gallagher et al. | 395/448 |
| 5,438,668 | 8/1995 | Coon et al. | 395/380 |
| 5,471,593 | 11/1995 | Branigin | 712/235 |
| 5,751,986 | 5/1998 | Fetterman et al. | 712/218 |
| 5,778,423 | 7/1998 | Sites et al. | 711/118 |

FOREIGN PATENT DOCUMENTS 0 402 856  12/1990  European Pat. Off. .

OTHER PUBLICATIONS

Paap, "PowerPC™: APerformance Architecture", Feb. 22, 1993, IEEE, pp. 104–108.

Research Disclosure, No. 315, XP 000134174, Disclosed Anonymously, "Opcode Compare Facility", pp. 577.

*Primary Examiner*—William M. Treat
*Attorney, Agent, or Firm*—Howard R. Boyle; David A. Plettner

[57] ABSTRACT

A computer apparatus which detects a store or load operation into or from a shared memory page by a program that does not provide for synchronization when executed by a CPU that completes instructions out of program order. After the store or load is detected, the CPU explicitly orders operations into the shared memory page. Store operations are ordered such that no new store into the shared memory page is performed until all prior store operations into the shared memory page are complete. Also, load operations are ordered such that load operations from the shared memory page are performed in program order. This ordering is achieved by maintaining a process bit and a memory attribute bit associated with a shared memory page. When both bits are true, all load or store operations referencing the shared memory page are ordered.

8 Claims, 11 Drawing Sheets

PROGRAM EXECUTION (SEQUENTIALLY-CONSISTENT)

| TIME | PROCESSOR 1 | PROCESSOR 2 |
|---|---|---|
| $T_0$ | — | LOAD MAIL FLAG (109) |
| $T_1$ | — | CHECK IF FLAG SET (111) |
| $T_2$ | — | BRANCH (TO MAIL FLAG LOAD)(113) |
| $T_3$ | STORE DATA IN MAIL BOX (103) | LOAD MAIL FLAG (109) |
| $T_4$ | STORE MAIL FLAG (105) | CHECK IF FLAG SET (111) |
| $T_5$ | — | BRANCH (TO MAIL FLAG LOAD)(113) |
| $T_6$ | — | LOAD MAIL FLAG (109) |
| $T_7$ | — | CHECK IF FLAG SET (111) |
| $T_8$ | — | BRANCH (NOT TAKEN)(113) |
| $T_9$ | — | LOAD DATA IN MAIL BOX (115) |
| $T_{10}$ | — | SUBSEQUENT INSTRUCTION (117) |

FIG. 2 (PRIOR ART)

PROGRAM EXECUTION

| TIME | PROCESSOR 1 | PROCESSOR 2 |
|---|---|---|
| $T_0$ | — | LOAD MAIL FLAG (109) |
| $T_1$ | — | CHECK IF FLAG SET (111) |
| $T_2$ | — | BRANCH (TO MAIL FLAG LOAD) (113) |
| $T_3$ | — | LOAD DATA IN MAIL BOX (115) |
| $T_4$ | STORE DATA IN MAIL BOX (103) | LOAD MAIL FLAG (109) |
| $T_5$ | STORE MAIL FLAG (105) | CHECK IF FLAG SET (111) |
| $T_6$ | — | BRANCH (NOT TAKEN) (113) |
| $T_7$ | — | SUBSEQUENT INSTRUCTION (117) |

FIG. 3 (PRIOR ART)

PROGRAM EXECUTION

| TIME | PROCESSOR 1 | PROCESSOR 2 |
|---|---|---|
| $T_0$ | — | LOAD MAIL FLAG (109) |
| $T_1$ | — | CHECK IF FLAG SET (111) |
| $T_2$ | — | BRANCH (TO MAIL FLAG LOAD) (113) |
| $T_3$ | — | BARRIER INSTRUCTION (401) |
| $T_4$ | STORE DATA IN MAIL BOX (103) | LOAD MAIL FLAG (109) |
| $T_5$ | STORE MAIL FLAG (105) | CHECK IF FLAG SET (111) |
| $T_6$ | — | BRANCH (TO MAIL FLAG LOAD) (113) |
| $T_7$ | — | BARRIER INSTRUCTION (401) |
| $T_8$ | — | LOAD MAIL FLAG (109) |
| $T_9$ | — | CHECK IF FLAG SET (111) |
| $T_{10}$ | — | BRANCH (NOT TAKEN) (113) |
| $T_{11}$ | — | BARRIER INSTRUCTION (401) |
| $T_{12}$ | — | LOAD DATA IN MAIL BOX (115) |
| $T_{13}$ | — | SUBSEQUENT INSTRUCTION (117) |

*FIG. 4B* (PRIOR ART)

COMPUTER THAT SELECTIVELY FORCES ORDERED EXECUTION OF STORE AND LOAD OPERATIONS BETWEEN A CPU AND A SHARED MEMORY

This is a continuation of application Ser. No. 08/234,207 filed on Apr. 28, 1994, now abandoned.

BACKGROUND

Most digital computers incorporate a single central processing unit (CPU) which is responsible for executing instructions in a program to perform some result. These uniprocessor systems generally have a very simple model of processor execution. That is, the CPU executes instructions in a way so that it appears to a programmer that the hardware is executing the instructions one at a time and in the order the instructions appear in the particular program being executed. This is called "program order" execution and this method of executing instructions is in wide use today in personal computers etc.

A single CPU computer executing instructions in program order has inherent instruction throughput limitations. Two of the biggest limitations occur because a CPU can be made to run only as fast as semiconductor technology allows and it is often a particular instruction cannot be executed immediately. To overcome the first limitation, computers have begun to utilize multiple parallel CPUs with each CPU executing a part of a program. The second limitation has been addressed, in part, by allowing a CPU to "suspend" an instruction which cannot be completed immediately and to begin executing a subsequent instruction to save time. The result is that while a CPU will start instructions in program order, the instructions may complete out-of-order. While allowing a CPU to complete instructions out of order is an advantage, this method of executing instructions creates other significant problems.

In order for multiple CPU computer systems to work effectively, the CPUs must be able to communicate back and forth. Commonly, CPUs communicate through the use of shared memory that is accessible to each. One example of how shared memory can be used for communications is a "mailbox" scheme, which will be used here to illustrate the present invention. In multiple CPU computers, often one CPU is performing an operation where the result of the operation will be used by another CPU. One way the CPUs can communicate is by using a "mailbox" with a "flag". That is, a location in memory is designated as the mailbox where a first CPU puts data for a second CPU to use. The second CPU reads a specified memory location to look for a particular bit pattern (the flag) which tells the second CPU that valid data is available in the mailbox for it to use. To understand the present invention, an understanding of how the mailbox process works is useful.

FIGS. 1 and 2 illustrate a mailbox communication technique between two CPUs. FIG. 1 illustrates a section of program code processor 1 will execute 101 with two instructions detailed. The first instruction 103 causes processor 1 to store data in the mailbox location. While the second instruction 105 causes processor 1 to set the mailbox flag. A section of program code processor 2 will execute is shown 107 with four instructions detailed. The first instruction 109 causes processor 2 to load the mail flag and the second instruction 111 causes processor 2 to test the flag to see if it is set (indicating there is valid data in the mailbox). Branch instruction 113 causes processor 2 to loop back and reload the mail flag (instruction 109) if the flag was not set (as determined by instruction 111). If the flag was set, then processor 2 will continue past the branch instruction 113 and execute the next instruction 115 which causes processor 2 to load the data in the mailbox.

An example of the execution of the instructions shown in FIG. 1 by processors 1 and 2 is illustrated in FIG. 2. These are "sequentially-consistent" CPUs which means they execute all instructions in program order and no later operation is performed until all prior operations are complete. Processor 1 stores data in the mailbox (instruction 103) at time $T_4$ and then stores the mail flag (instruction 105) at time $T_5$. During the period indicated by time $T_0$–$T_3$, processor 1 would be executing other instructions not illustrated. In this example, processor 2 loads the mail flag (instruction 109) at time $T_0$ and checks to see if the flag is set (instruction 111) at time $T_1$. The branch instruction (113) is executed at time $T_2$ and since the flag has not yet been set by processor 1, the branch instruction causes processor 2 to branch to the load mail flag instruction 109 and reload the mail flag at time $T_3$. The flag is checked again at time $T_4$ and since the flag is still not set yet the branch instruction causes processor 2 to branch back again to the load mail flag instruction which is executed at time $T_6$. The flag is rechecked at time $T_7$ and since the flag was set by processor 1, the branch instruction executed at time $T_8$, does not cause processor 2 to branch so processor 2 now loads the data in the mailbox (instruction 115) at time $T_9$.

In this example, processor 2 is assured of loading the proper mailbox data as processor 2 does not load from the mailbox until processor 1 has stored the mailbox data and set the flag. If the CPUs do not maintain sequential-consistency, that is, a CPU can complete a subsequent instruction before all prior instructions are executed, the mailbox communication technique can fail.

A simple example of the mailbox communication technique failing is illustrated in FIG. 3 showing the instructions detailed in FIG. 1 being executed by CPUs which do not always execute instructions in a sequentially consistent way. Processor 1 performs two operations. The first operation 103 is to store data in the mailbox during time $T_4$ and the second operation is to store the mail flag 105 during time $T_5$. Processor 2 loads the mail flag at time $T_0$ (109) and then checks to see if the mail flag is set 111 during time $T_1$. However the mail flag will not be stored by processor 1 until $T_5$ and so the flag test performed by processor 2 will fail and the branch instruction 113 executed at time $T_2$ will cause processor 2 to loop back to the mail flag load. If the processor cannot immediately load the mail flag, for example it is not in cache but in main memory, the processor suspends execution of the mail flag load. However since processor 2 can perform the subsequent load of the mailbox data 115 it does so (the CPU "speculates" that this instruction will need to be performed later and therefore performs the load to save time). The CPU completes the reload of the mail flag at time $T_4$ and retests the flag at time $T_5$. On this second try, processor 2 will find the flag set and therefore the branch instruction executed at time $T_6$ will not cause processor 2 to branch. Since processor 2 already completed the load of data from the mailbox during $T_3$, the processor will not redo the load (it assumes its speculation was correct) but will continue on and execute the subsequent instruction 117 in the program. However, processor 2 will have read invalid data in the mailbox. This is an unacceptable result.

To allow CPUs to execute instructions in a non-sequential way while preventing inter-CPU communication failures, special instructions called "barrier" instructions have been used. These instructions force a CPU to finish prior instructions before preceding past the barrier instruction. A computer programmer uses these instructions to insure that areas of program code that need to be executed in program order are executed in program order by a CPU. In this way, a CPU will only be forced to execute instructions in program order in relatively small parts of a program leaving the CPU free to execute the rest of the program instructions with maximum efficiency.

FIGS. 4A and 4B illustrate the use of a barrier instruction to prevent the problem illustrated in FIG. 3 from occurring. FIG. 4A lists the portions of a program each CPU will execute and is the same as discussed before with the addition of a barrier instruction 401 placed before the "load data in the mailbox instruction" 115. Processor 1 performs operations 103 and 105 during times $T_4$ and $T_5$ respectively. Processor 2 performs the same operations in $T_0$–$T_2$ as discussed in association with FIG. 3. However a barrier instruction 401 has been added after the branch instruction 113 and before the load data in the mailbox instruction 115. Therefore after processor 2 tests the flag and finds the flag is not set, the barrier instruction prevents processor 2 is prevented from "speculating" and loading the data in the mailbox forcing the processor to complete the flag load and test operation before continuing. Even if the reload of the mail flag was delayed and the processor could have loaded the mailbox data, the barrier instruction forces the processor to complete all pending instructions before continuing. The loading of data from the mailbox is finally accomplished at time $T_{12}$ at which time the mailbox data is valid. Using the barrier instruction has prevented processor 2 from loading invalid data from the mailbox.

While the problem with non-sequential execution has been illustrated with respect to "load" operations, the same problem is present with "store" operations. The use of barrier instruction will also prevent problems with non-sequential "store" operations. However, while a programmer may write a new program utilizing "barrier" instructions, the vast majority of program code in use today is old code that does not utilize "barrier" instructions. If one CPU is executing new code (having barrier instructions) and another CPU is executing old code (no ability to insure sequential execution) then the mailbox communication technique will fail. Both CPUs must execute communications instructions in sequential order.

Often CPUs that can execute instructions in a non-sequential way can be forced to execute all instructions in sequential order. So if the CPU executing the "old" code is forced to execute the entire program in sequential order (start and complete instructions sequentially), successful inter-CPU communications will be assured. But since inter-CPU communications is generally an infrequently performed function in a program, forcing the CPU to execute all instructions sequentially extracts a high performance price to assure success of an infrequent task.

What is needed in the industry is a computer that selectively executes load and store instructions in an ordered way when required and without the use of special barrier instructions. In this way, old programs can be effectively utilized while, at the same time, gaining most of the performance advantages obtained by allowing a CPU to complete instructions in a non-sequential way.

SUMMARY OF THE INVENTION

A computer constructed according to the present invention executes old programs, which do not utilize barrier instructions, in an ordered way when required. Otherwise the computer executes the program in a manner most efficient for the computer. The computer includes an addressable memory area and a memory attribute bit associated with a single memory address or group of memory addresses. When the memory attribute bit is "set" (logical true) it indicates that the memory area associated with the bit is shared by two or more programs or multiple CPUs. Each CPU in the computer also includes a process status bit. This status bit, when set, indicates the CPU is currently executing a program that does not utilize barrier instructions or other means to force program order execution when needed.

When a CPU makes an access to a memory address, the process status bit and the memory attribute bit are checked to detect if both bits are "set". If both bits are set, then the CPU executes load and store instructions that reference the memory area, associated with the memory attribute bit, in a particular "ordered" manner. That is, a "store" instruction will not be executed until all prior started store instructions are completed. This will be referred to as an "ordered store" instruction. If both bits are set, then a "load" instruction will be completed by the CPU before any subsequent load instruction is completed. This will be referred to as an "ordered load" instruction.

This new and novel architecture provides the synchronization needed by old programs, while at the same time, providing improved efficiency over what is available with prior art sequential execution computers.

BRIEF DESCRIPTION OF THE DRAWINGS

FIG. 2 illustrates the execution of commands shown in FIG. 1.

FIG. 3 illustrates the execution of the commands shown in FIG. 1 by non-sequentially consistent CPUs.

FIG. 4b illustrates a prior art use of a barrier instruction before a mailbox load operation.

DETAILED DESCRIPTION OF THE INVENTION

Figure 1:
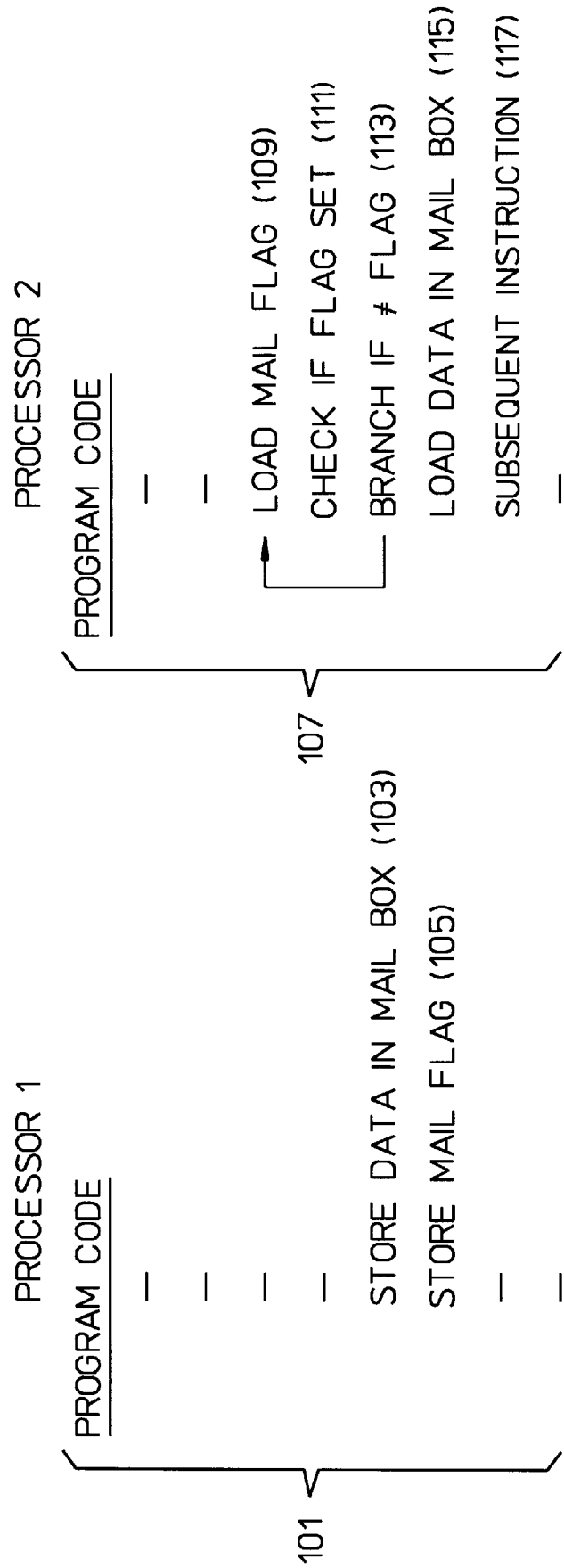
FIG. 1 illustrates a partial instruction flow for two independent CPUs using mailbox communications.
Figure 4A:
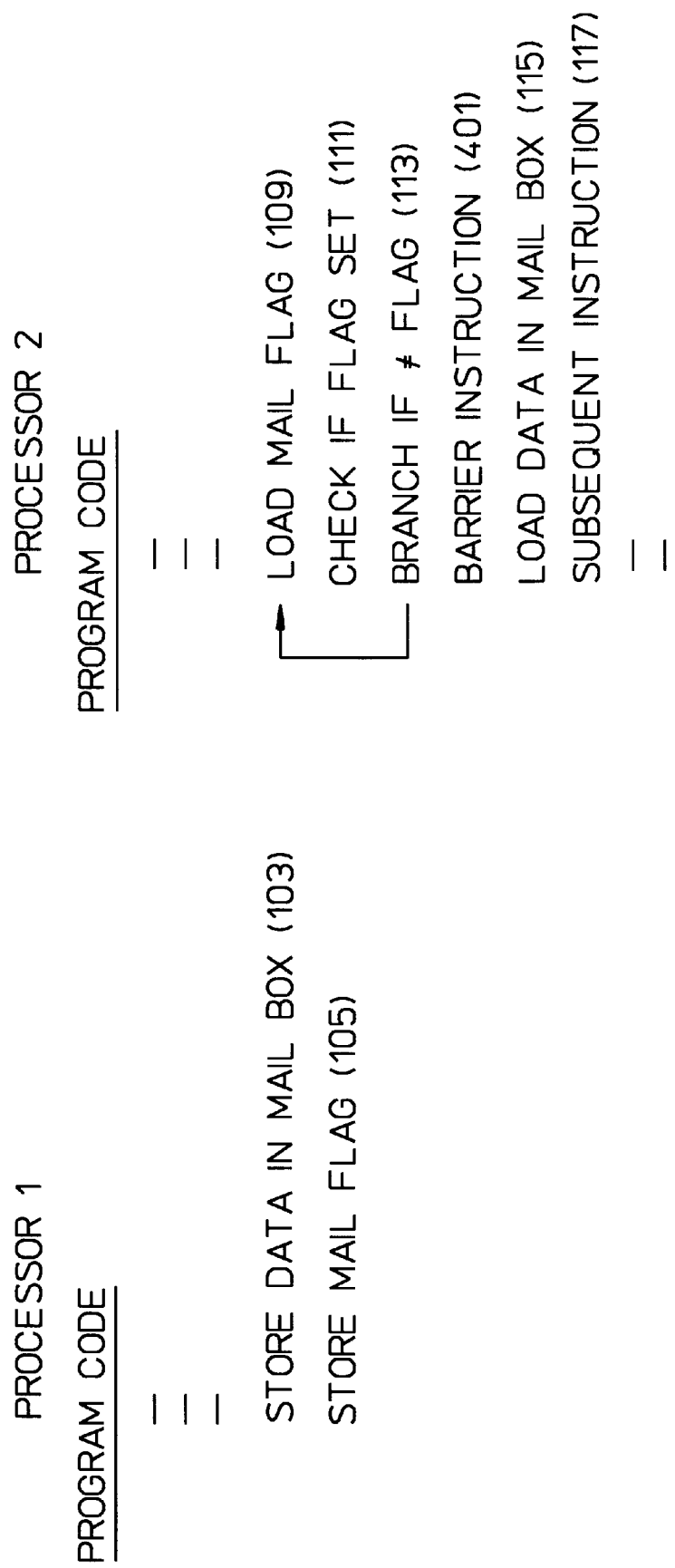
FIG. 4A illustrates a partial instruction flow for two CPUs using mailbox communications and incorporating a barrier instruction.

The computer industry is driven to use multi-CPU computer systems and CPUs that complete instructions out of strict program order for performance reasons. But since most programs in use today do not utilize barrier instructions or the like, some accommodation must be made to allow these "old" programs to run correctly. It should be noted that if an old program is executed by a single CPU, and that program does not communicate with any other CPU or program, no problem will result even if the CPU completes instructions out of order. That is because while a CPU may have a plurality of instructions pending, and some of the later instructions may complete before instructions started earlier, the CPU will maintain the appearance of program order execution to the program being executed.

However, this appearance of program order is only true for a program being run by a particular CPU. When the sequence of instructions being executed by a first CPU is viewed by a second CPU or program (the two CPUs or programs interact within a particular memory area-shared memory-), the second CPU or program sees an out-of-order execution sequence. This out of order execution is what causes the communications failures described above. Therefore, it is only when an old program interacts with another program or CPU that there is a concern with program order execution. The present invention uses a memory attribute bit and a process status bit to determine when a CPU must execute instructions, referencing a location in memory used for communications, in program order (complete instructions in sequential order).

An operating system (OS) is a software program that is responsible for controlling how work is done by the host computer. Allocating CPU time, disk space and memory to the various programs running on the computer are typical tasks performed by the OS. The OS "discovers" which pages are being used by different CPUs (or programs) to communicate by noting which pages are being shared. As the OS dynamically discovers a memory page is being shared, the OS sets a memory attribute bit associated with that memory page. This attribute bit is maintained by the computer's memory management system and becomes part of the translation lookaside buffer (TLB) when the particular page is resident in the computer's main memory and is referenced. When a CPU makes a reference to a page of memory, the CPU checks the memory attribute bit associated with that page to determine if that page is used for communications.

While the CPU may know a memory page used for communications is being referenced, the CPU still needs to know if the program being executed by the CPU needs the CPU to automatically execute instructions referencing that page in program order. For example, a "new" program that uses barrier instructions will have already made the necessary provisions to insure correct communications. Whereas an "old" program will need the CPU to provide the necessary ordering of instructions to prevent a communications failure. Therefore a "process status bit" associated with the particular program being executed by the CPU is maintained by the CPU. This process status bit is maintained in a processor status register of the CPU. The required process information, used to determine if a program uses barrier instructions etc., can be generated many ways. For example, if the program is compiled or assembled, the compiler or assembler can generate special codes to alert the computer that the program is a "new" program. When the program is loaded into the computer, the OS looks at the special codes and sets the process status bit accordingly.

Figure 5:
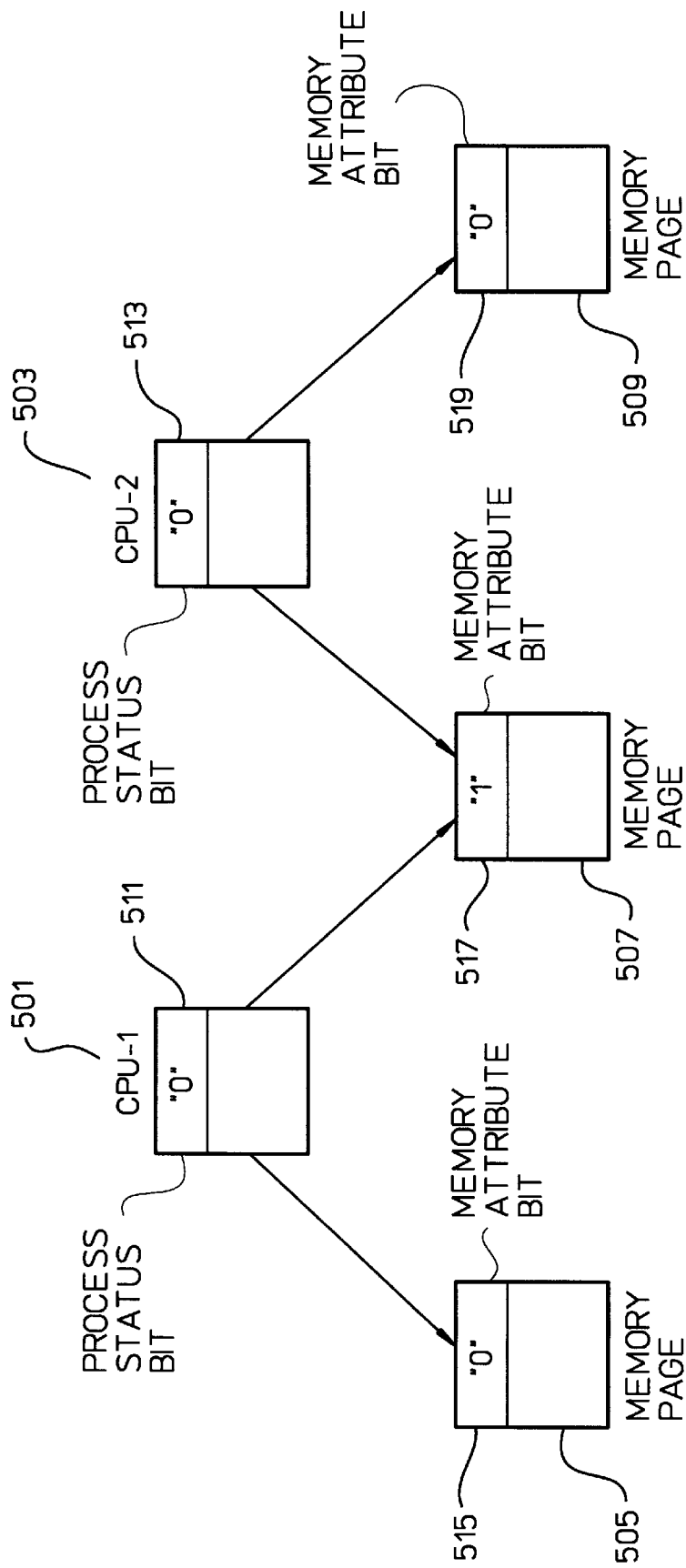
FIG. 5 illustrates two CPUs interacting with shared and private memory pages.
Figure 6:
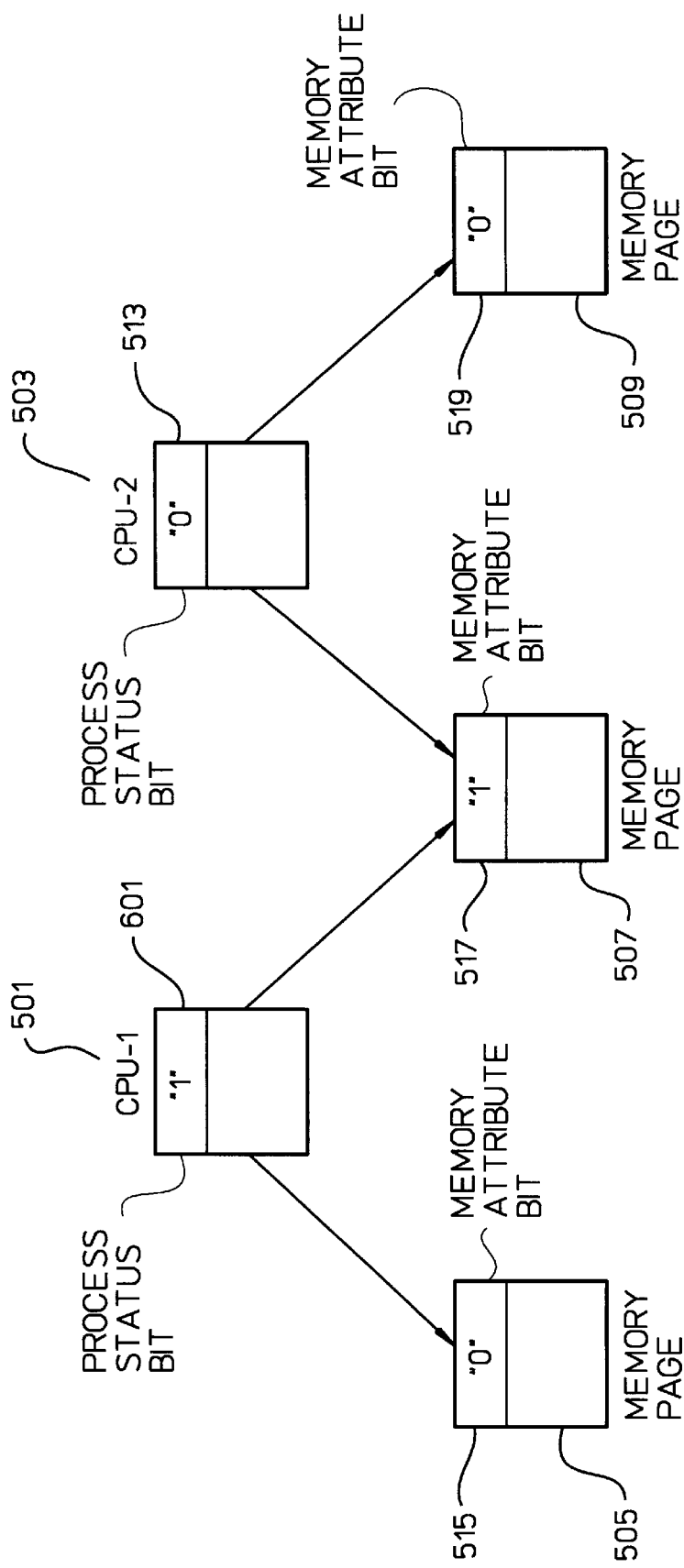
FIG. 6 illustrates two CPUs interacting with shared and private memory pages where one CPU is executing a program that needs explicit CPU instruction ordering.
Figure 7:
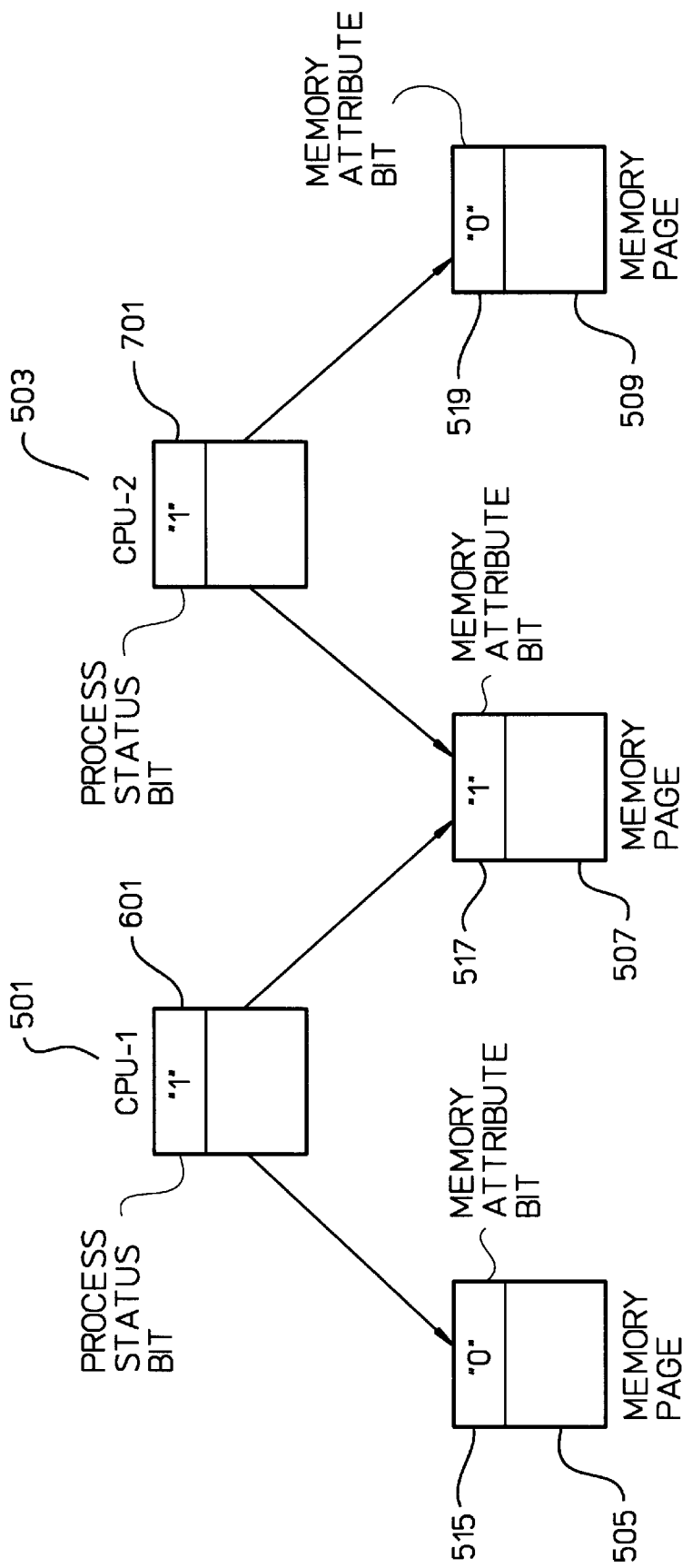
FIG. 7 illustrates two CPUs where both CPUs are executing programs which need explicit CPU instruction ordering.

So when a program makes a reference to a memory page, the CPU checks both the memory attribute bit and the process status bit to determine if the CPU must execute (start and complete) all instructions referencing that particular page in program order. FIGS. 5, 6 and 7 illustrate the possible combinations with two CPUs each executing a single program.

FIG. 5 illustrates two CPUs 501 and 503 and three memory pages 505, 507 and 509. Each CPU 501 and 503 has a process status bit 511 and 513 and each of the memory pages 505, 507 and 509 have a memory attribute bit 515, 517 and 519 respectively. The process status bits 511 and 513 are both "0" which means the CPUs 501 and 503 are both executing "new" programs which utilize barrier instructions, or the like, to insure correct program execution. Memory pages 505 and 509 both have their respective memory attribute bits set to "0" which indicates these memory pages are not shared between CPUs and therefore do not need to have instructions referencing these pages ordered. Memory page 507 has the associated memory attribute bit set to a "1" which indicates this memory page is shared between CPUs and therefore may need to have instructions referencing this page ordered.

When CPU-1 501 accesses memory page 505 or CPU-2 503 accesses memory page 509, the CPUs will not have to explicitly order instructions as neither memory pages are shared. If CPU-1 501 accesses memory page 507, the CPU will detect that the memory attribute bit 517 is set ("1"). Since the process status bit 511 is not set ("0"), then the CPU will not be forced to explicitly order instructions that reference memory page 507. That is, CPU-1 is executing a program that does not need the CPU to explicitly order instructions as the program has been written to avoid a communications problem. The same holds true for CPU-2 in this example.

FIG. 6 illustrates the same CPUs and memory pages as in FIG. 5. However in this example the process status bit 601 for CPU-1 501 is set ("1") which indicates that CPU-1 is executing an "old" program that does not insure instructions are executed sequentially when required. Therefore when CPU-1 accesses memory page 507, CPU-1 must explicitly cause the instructions that reference that memory page to execute in program order. When CPU-1 accesses memory page 507, CPU-1 determines that both the process status bit 601 and the memory attribute bit 517 are both "1" and therefore executes all instructions that reference memory page 507 in an ordered way. When CPU-1 access memory page 505, CPU-1 does not order instructions as that memory page is not shared as indicated by the memory attribute bit 515 being "0". CPU-2 operates as described in association with FIG. 5.

FIG. 7 illustrates same CPUs and memory pages as in FIGS. 5 and 6 but with the process status bit 701 set ("1") for CPU-2 503. This indicates that CPU-2 503 is executing an "old" program and the CPU must order instructions that reference a shared memory page. When either CPU-1 501 or CPU-2 503 access memory page 507, the CPUs must insure that the instructions that reference the shared memory page 507 are executed in an ordered way.

This architecture allows computers executing "old" programs to achieve most of the speed advantages available from allowing instructions to complete out of program order. In addition computers built according to the present invention will be able to execute a mix of "old" and "new" programs without the risk of communications failures or other similar problems relating to sharing memory pages between CPUs or programs.

Figure 8:
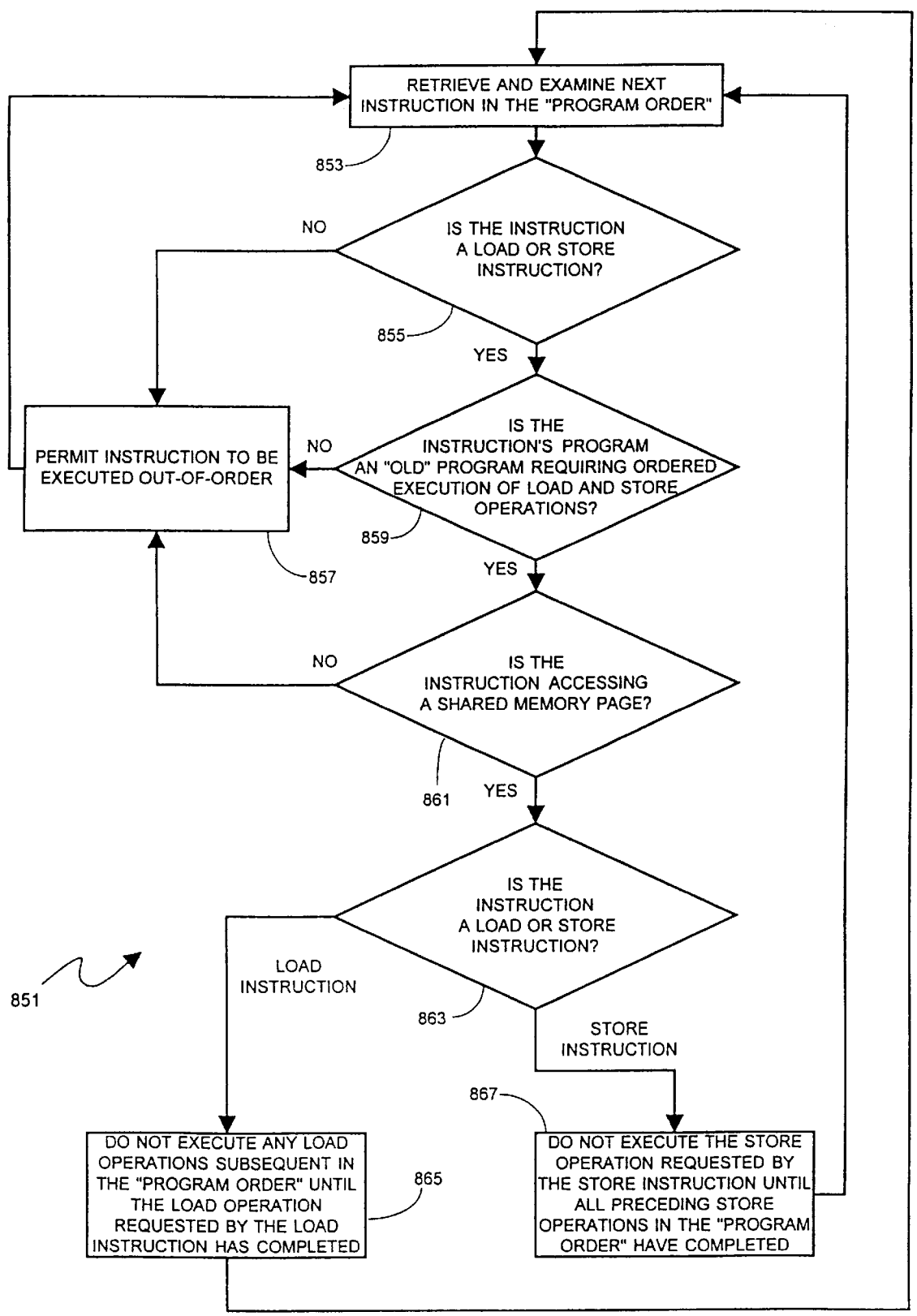
FIG. 8 is a flow chart illustrating the instruction control process utilized in the present invention.

FIG. 8 is a flow chart illustrating the instruction control process 851 utilized in the present invention. At block 853 of process 851, the next instruction in the "program order" is retrieved and examined. The instruction may be retrieved from an instruction queue, or some other type of structure in which pending instructions are stored.

Decision block 855 determines whether the instruction is a load or store instruction. If the instruction is not a load or store instruction, then the "no" branch is taken to block 857, which permits the instruction to be executed out-of-order. Control then loops back to block 853, which retrieves and examines the next instruction in the "program order." In one embodiment, block 857 represents a signal that is sent to the rest of the CPU that indicates that the instruction may be executed out-of-order. If the instruction is a load or store instruction, the "yes" branch is taken to decision block 859.

Decision block 859 determines whether the program associated with the instruction is an "old" program that requires ordered execution of load and store operations. In FIGS. 5, 6, and 7, the process status bits indicate whether a CPU is executing an "old" program. If the program is not an "old" program, the "no" branch is taken the block 857 and the instruction may be executed out-of-order. If the program is an "old" program, the "yes" branch is taken to decision block 861.

Decision block 861 determines whether the instruction is accessing a shared memory page. If the instruction is not accessing a shared memory page, the "no" branch is taken to block 857 and the instruction may be executed out-of-order. If the instruction is accessing a shared memory page, the "yes" branch is taken to decision block 863.

Decision block 863 determines whether the instruction is a load instruction or a store instruction. If the instruction is a load instruction, the "load instruction" branch is taken to block 865. If the instruction is a store instruction, the "store instruction" branch is taken to block 867.

Block 865 ensures that no load operations accessing the shared memory page and requested by load instructions that come after (in the program order) the load instruction being examined are executed before the load operation requested by the load instruction being examined has completed. On other words, execution of subsequent load instructions that access the shared memory must occur in program order. Note that all instructions that precede (in the program order) the load instruction being examined need not execute before the load instruction. In addition, any subsequent instruction that is not a load instruction that accesses the shared memory may execute before the load instruction being examined. In one embodiment, block 865 generates a signal that is sent to the rest of the CPU and indicates that subsequent load operations cannot be executed until the load operation requested by the load instruction being examined has completed. After block 865 completes its function, control returns to block 853.

Block 867 ensures that the store operation associated with the store instruction being examined is not executed until all preceding (in the program order) load operations have completed. Note that all instructions after (in the program order) the store instruction being examined are eligible to be executed before the store operation being examined. In addition, any preceding instruction that is not a store instruction that accesses the shared memory need not complete before the store instruction being examined. In one embodiment, block 867 generates a signal that is sent to the rest of the CPU and indicates that the store operation associated with the store instruction being examined cannot be executed until all preceding store operations in the "program order" have completed. After block 867 completes its function, control returns to block 853.

Figure 9:
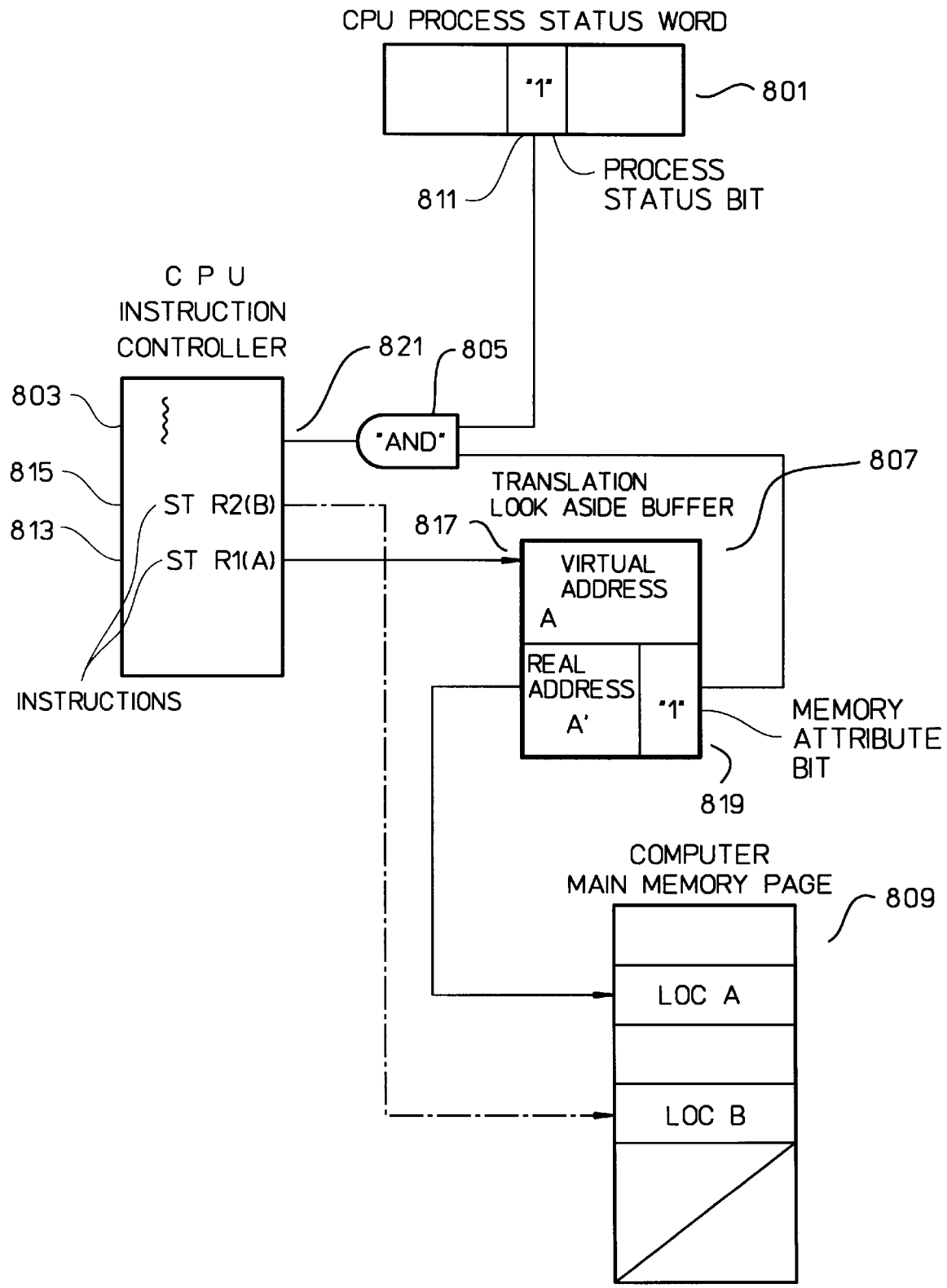
FIG. 9 is a simplified diagram of the present invention with the computer hardware executing two store instructions.

FIG. 9 illustrates a simplified control system to insure a CPU orders instructions that reference a shared memory page when needed. A process status word 801, an instruction controller 803 and an "and" gate 805 internal to a CPU are shown. A translation lookaside buffer (TLB) 807 and a memory page 809 that would be part of a memory system shared by multiple CPUs are also shown. The process status word 801 has a process status bit 811 set ("1") which indicates the associated CPU is executing an "old" program which needs explicit instruction ordering when accessing a shared memory page. The instruction controller 803 has two store instructions 813 and 815 queued.

Store instruction 813 is the first of the two instructions and therefore is the first started by the instruction controller 803. Instruction 813 instructs the controller to store (ST) the contents of register 1 (not shown) into virtual memory location "A". The CPU hardware looks up the virtual address "A" in the TLB 807. The TLB has an entry "A" 817 which is associated with a "real" address "A'". The CPU hardware then stores the contents of register 1 into the real address "A'" which is located in memory page 809. The hardware and techniques to do the TLB translation and store operation are well known by those skilled in the microprocessor art.

The TLB "A" entry is also associated with a memory attribute bit 819. This bit is set ("1") indicating memory address A' is within a shared memory page 809. If both the process status bit 811 and the memory attribute bit 819 are set ("1"s), then the "AND" gate 805 sends a control signal 821 to the instruction controller 803. This control signal prevents the instruction controller from executing store instruction 815 until store instruction 813 is complete. However the instruction controller need not stop all store instructions from being executed before store instruction 813 is completed. If instruction 815 referenced a memory location outside of the shared memory page 809, then instruction 815 could be started and completed before instruction 813 was complete. That is because a second CPU or program is not relying on the result of the store operation associated with instruction 815 as the store operation does not take place in a shared memory page. As illustrated however, instruction 815 references a location within the shared memory page 809 and therefore the instruction controller 803 will not perform the store operation associated with instruction 815 until instruction 813 is complete.

While there are many ways to implement the required hardware, the desired result is that the second store operation 815 into the shared memory page does not occur until the previous store operation into the shared memory page is complete. Thereby preventing a mail flag from being set before data is placed in a mailbox location.

Figure 10:
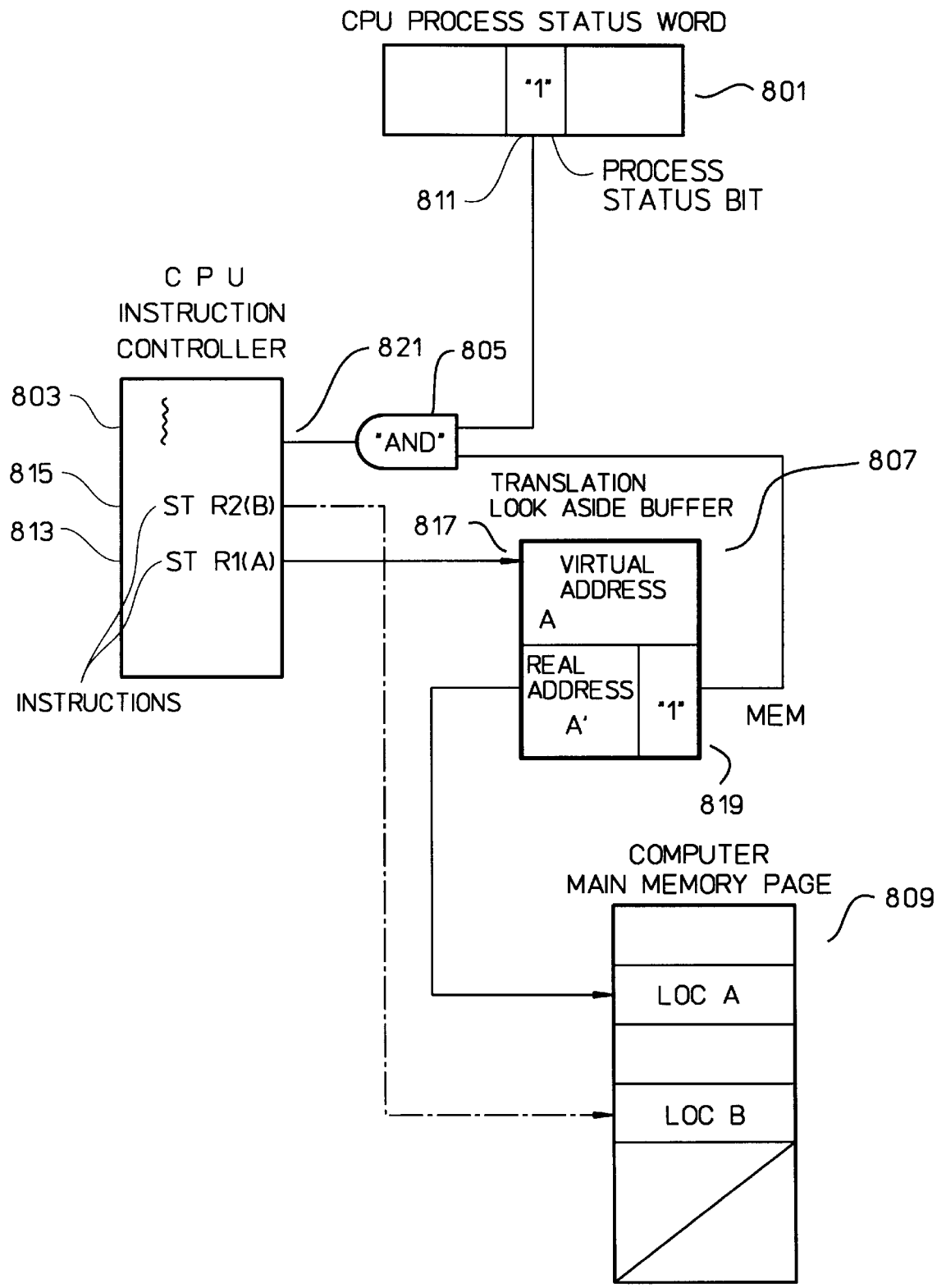
FIG. 10 is a simplified diagram of the present invention with the computer hardware executing two load instructions.

FIG. 10 illustrates the CPU and computer hardware of described in FIG. 9 however instead of performing store operations two load instructions 901 and 903 are queued in the instruction controller 803. The operation is as described in association with FIG. 9 with the desired result being that load instruction 901 is completed before load instruction 903.

If either the process status bit 811 or the memory attribute bit 819 is not set ("0"), then the instruction controller can continue to execute instructions subsequent to instructions 813 or 901 respectively before instructions 813 or 901 are complete. The presumption is that either synchronization is not needed or synchronization is provided by some other means such as the use of barrier instructions. While this new and novel computer architecture has been illustrated in one limited use, mailbox communications, this architecture permits hardware design approaches not practical before. Also it permits a user to continue to use "old" programs while gaining the most of the advantages provided by new CPUs that do not process instructions strictly in program order. Of course, while the embodiment described uses the memory attribute and the process status bit to select which mode (sequential or ordered) the CPU uses to execute instructions, other modes are advantageous. For example, a mode could "order" the execution of instructions such that an "ordered load" to a shared memory area by a CPU executing an "old" program is performed prior to a subsequent load instruction being performed or a store instruction that references a shared memory area. In like manner a mode could "order" instructions such that an "ordered store" instruction is completed only after all prior store instructions are complete and all prior load instructions which reference a shared memory area are complete. Many other advantageous modes of operation are also possible.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A digital computer having a central processing unit (CPU) that executes computer instructions associated with a computer program, including load and store instructions, wherein the computer instructions are in a program order, comprising:

a control system operative to control the CPU as follows:
if a first load instruction being executed by the CPU references a shared memory area used for inter-process communication with either another program or another CPU, and a process status bit associated with the CPU has a particular value indicating that load instructions accessing the shared memory area and associated with the program must be ordered, the control system controls the CPU such that a second load operation requested by a second load instruction that accesses the shared memory area and is subsequent to the first load instruction in the program order is not completed prior to a first load operation requested by the first load instruction being completed, while allowing other instructions subsequent to the first load instruction in the program order to execute before the first load operation is completed; or
if a second store instruction being executed by the CPU references a shared memory area used for inter-process communication with either another program or another CPU, and a process status bit associated with the CPU has a particular value indicating that store instructions accessing the shared memory area and associated with the program must be ordered, the control system controls the CPU such that a second store operation requested by the second store instruction is not completed until a first store operation requested by a first store instruction that accesses the shared memory area and precedes the second store instruction in the program order has completed, while the second store operation is allowed to complete before other instructions that precede the second store instruction in the program order.

2. A digital computer as in claim 1 wherein the control system detects a reference to a shared memory area by checking that a memory attribute bit, associated with the referenced memory area, has a particular value.

3. A digital computer as in claim 2 wherein the memory attribute bit is stored in a translation lookaside buffer.

4. A digital computer as in claim 1 wherein the process status bit is stored in a CPU register.

5. A digital computer having a central processing unit (CPU) that executes computer instructions associated with a computer program, including load and store instructions, wherein the instructions are in a program order, comprising:

a control system operative to control the CPU as follows:
if a first load instruction being executed by the CPU references a shared memory area used for inter-process communication with either another program or another CPU, and a process status bit associated with the CPU has a particular value indicating that load instructions accessing the shared memory area and associated with the program must be ordered, the control system controls the CPU such that a second load operation requested by a second load instruction that accesses the shared memory area and is subsequent to the first load instruction in the program order is not completed prior to a first load operation requested by the first load instruction being completed, and no store operation requested by a store instruction that is subsequent to the first load instruction in the program order and references the shared memory area is completed until the first load instruction is completed, while allowing other instructions subsequent to the first load instruction in the program order to execute before the first load operation is completed; or
if a second store instruction being executed by the CPU references a shared memory area used for inter-process communication with either another program or another CPU, and a process status bit associated with the CPU has a particular value indicating that store instructions accessing the shared memory area and associated with the program must be ordered, the control system controls the CPU such that a second store operation requested by the second store instruction is not completed until a first store operation requested by a first store instruction that accesses the shared memory area and precedes the second store instruction in program order has completed, and the second store operation requested by the second store instruction is not completed until all load operations requested by load instructions that reference the shared memory area and precede the second store operation in program order are completed, while the second store operation is allowed to complete before other instructions that precede the second store instruction in the program order.

6. A digital computer as in claim 5 wherein the control system detects a reference to a shared memory area by checking that a memory attribute bit, associated with the referenced memory area, has a particular value.

7. A digital computer as in claim 6 wherein the memory attribute bit is stored in a translation lookaside buffer.

8. A digital computer as in claim 5 wherein the process status bit is stored in a CPU register.

* * * * *